United States Patent
Momtahan et al.

(10) Patent No.: US 10,700,780 B2
(45) Date of Patent: Jun. 30, 2020

(54) SYSTEMS AND METHODS FOR ADJUSTING MOVABLE LENSES IN DIRECTIONAL FREE-SPACE OPTICAL COMMUNICATION SYSTEMS FOR PORTABLE ELECTRONIC DEVICES

(71) Applicant: Apple Inc., Cupertino, CA (US)

(72) Inventors: Omid Momtahan, Palo Alto, CA (US); Tong Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/399,925

(22) Filed: Apr. 30, 2019

(65) Prior Publication Data

US 2019/0372667 A1 Dec. 5, 2019

Related U.S. Application Data

(60) Provisional application No. 62/678,215, filed on May 30, 2018.

(51) Int. Cl.
| | |
|---|---|
| *H04B 10/112* | (2013.01) |
| *H04B 10/50* | (2013.01) |
| *G02B 26/08* | (2006.01) |
| *H04B 10/079* | (2013.01) |
| *G02B 26/10* | (2006.01) |
| *H04B 10/69* | (2013.01) |

(52) U.S. Cl.
CPC ..... *H04B 10/1121* (2013.01); *G02B 26/0875* (2013.01); *G02B 26/101* (2013.01); *H04B 10/07955* (2013.01); *H04B 10/503* (2013.01); *H04B 10/691* (2013.01)

(58) Field of Classification Search
CPC .......... H04B 10/1121; H04B 10/07955; H04B 10/503; H04B 10/691; G02B 26/0875; G02B 26/101
USPC .......................................... 398/38
See application file for complete search history.

(56) References Cited

U.S. PATENT DOCUMENTS

| | | | |
|---|---|---|---|
| 5,539,562 A * | 7/1996 | Morioka | H04B 10/1125 398/131 |
| 5,978,401 A | 11/1999 | Morgan | |
| 6,055,262 A | 4/2000 | Cox et al. | |
| 6,253,097 B1 | 6/2001 | Aronow et al. | |
| 6,272,269 B1 | 8/2001 | Naum | |
| 6,348,684 B1 | 2/2002 | Nykolak et al. | |
| 6,459,835 B1 | 10/2002 | Nagaoka et al. | |
| 6,574,398 B2 | 6/2003 | Coldren et al. | |

(Continued)

FOREIGN PATENT DOCUMENTS

WO WO 10/111961 10/2010

OTHER PUBLICATIONS

U.S. Appl. No. 16/298,696, filed Mar. 11, 2019, Momtahan.

(Continued)

*Primary Examiner* — Dalzid E Singh
(74) *Attorney, Agent, or Firm* — Brownstein Hyatt Farber Schreck, LLP

(57) ABSTRACT

A directional free-space optical communication system includes a source device including a laser diode and an endpoint device including a photodiode. The endpoint device and the source device also include an adjustable optics subsystem that increases both angular and positional offset tolerance between the source device and the endpoint device.

19 Claims, 12 Drawing Sheets

(56) References Cited

U.S. PATENT DOCUMENTS

| | | | |
|---|---|---|---|
| 8,153,502 B2 | 4/2012 | Li et al. | |
| 8,319,311 B2 | 11/2012 | Chen et al. | |
| 8,783,893 B1 | 7/2014 | Seurin et al. | |
| 8,995,841 B1 | 3/2015 | Chalfant, III et al. | |
| 9,799,727 B2 | 10/2017 | Zhou | |
| 9,929,806 B2 | 3/2018 | Wabnig et al. | |
| 9,998,217 B2 | 6/2018 | Li et al. | |
| 10,031,158 B1 | 7/2018 | Douglas et al. | |
| 10,072,815 B2 | 9/2018 | MacKinnon et al. | |
| 10,181,895 B2 | 1/2019 | Liu | |
| 2006/0103941 A1 | 5/2006 | Yamaguchi et al. | |
| 2010/0284689 A1* | 11/2010 | Yuki | H04B 10/07955 398/25 |
| 2014/0213034 A1 | 7/2014 | Chang et al. | |
| 2015/0144918 A1 | 5/2015 | Cho et al. | |
| 2017/0353680 A1* | 12/2017 | Fukuda | H01L 27/14643 |
| 2018/0278828 A1* | 9/2018 | Moon | G02B 7/346 |
| 2018/0367767 A1 | 12/2018 | MacKinnon | |

OTHER PUBLICATIONS

U.S. Appl. No. 16/399,937, filed Apr. 30, 2019, Chen et al.
Leitgeb et al., "Using Tapers for Efficient Coupling of Received FSO-Signals into Fibres," 13th International Conference on Transparent Optical Networks in Stockholm, Sweden, Jun. 26-30, 2011, Institute of Broadband Communications, University of Technology, Graz, Austria, pp. 1-6.

* cited by examiner

SYSTEMS AND METHODS FOR ADJUSTING MOVABLE LENSES IN DIRECTIONAL FREE-SPACE OPTICAL COMMUNICATION SYSTEMS FOR PORTABLE ELECTRONIC DEVICES

CROSS REFERENCE TO RELATED APPLICATION

This application is a nonprovisional of and claims the benefit under 35 U.S.C. 119(e) of U.S. Provisional Patent Application No. 62/678,215, filed May 30, 2018, and entitled "Systems and Methods for Adjusting Movable Lenses in Directional Free-Space Optical Communication Systems for Portable Electronic Devices," the contents of which is incorporated by reference as if fully disclosed herein.

FIELD

Embodiments described herein relate to free-space optical communication systems and, in particular, to systems and methods for dynamically adjusting movable lenses for such systems incorporated into portable electronic devices.

BACKGROUND

An electronic device can include a free-space optical communication system to wirelessly transmit, receive, or exchange data with another electronic device. In some cases, the optical communication system may be configured to be directional (e.g., line-of-sight) in order to increase data transfer rates, to increase data transfer privacy, or for any other suitable purpose.

However, a conventional directional free-space optical communication system is exceptionally dependent on precise alignment of communicating devices. As such, conventional free-space optical communication systems cannot be incorporated into portable electronic devices that may be moved or repositioned from time to time.

SUMMARY

Embodiments described herein reference an apparatus for free-space optical communication in a portable electronic device. The apparatus includes a photosensitive element coupled to a substrate. In many embodiments, the photosensitive element includes at least two separated photosensitive areas. The apparatus also includes a movable lens positioned above the photosensitive element. The apparatus additionally includes a controller configured to adjust a position of the movable lens based on a power output from a first photosensitive area of the photosensitive element and a power output from a second photosensitive area—if any—of the photosensitive element.

Some embodiments described herein reference a method of operating a free-space optical communication system with a source device and an endpoint device, the method including the operations of: changing a position of a movable lens positioned over a laser diode in the source device according to a pattern; monitoring power output from a photosensitive area of a photodiode in the endpoint device for a maximum and, in response, sending a signal to the source device to stop changing a position of the source device lens; changing a position of a second movable lens positioned over the photodiode in the endpoint device; and monitoring power output from a photosensitive area of the photodiode for another maximum and, in response, stopping movement of the second movable lens.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
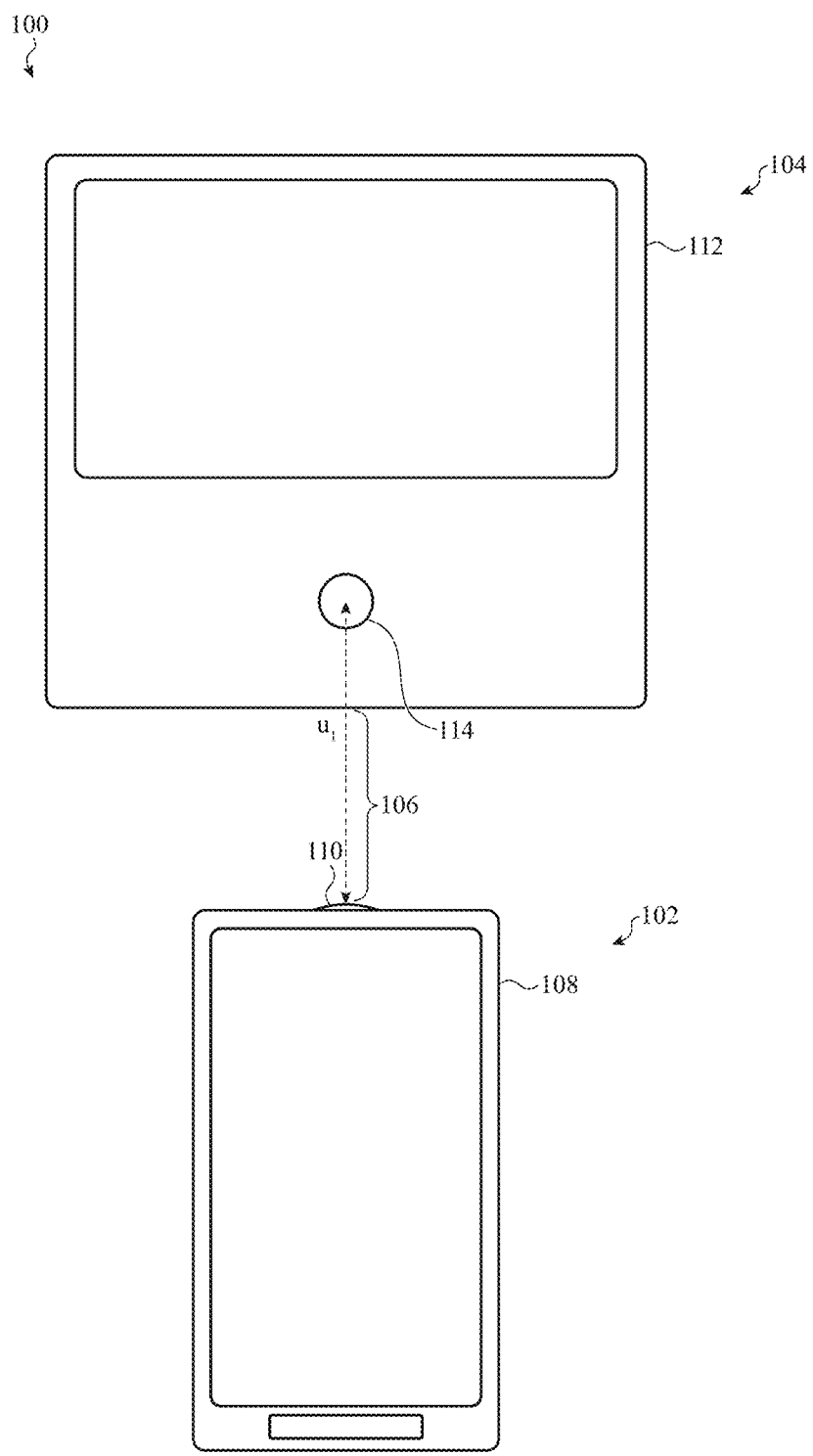
FIG. 1A depicts a directional free-space optical communication system coupling two electronic devices.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference electronic devices configured to receive data from other electronic devices via free-space optical communication.

As used herein, the phrase "free-space optical communication" refers to the delivery of digital and/or analog information or data from at least one "source device" to at least one "endpoint device" by selectively modulating and/or otherwise controlling the amplitude, frequency, phase, polarization, angle, pulse width, duty cycle, and/or any other suitable characteristic of visible or traditionally non-visible light propagating through a medium (e.g., gases, liquids, vacuum, and so on) that physically separates the source device(s) from the endpoint device(s).

Any stationary or portable electronic device can be either (or both) a source device or an endpoint device of a free-space optical communication system, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; health or medical devices; implantable devices; clothing-embedded devices; fashion accessory devices; home or industrial appliances; media appliances; and so on.

In some embodiments, a free-space optical communication system is "directional" in that focused light or laser light emitted from the source device(s) propagates through a medium between the source device(s) and the endpoint device(s) along a substantially line-of-sight path. A directional free-space optical communication system can facilitate increased data transfer rates (e.g., tens of gigabits per second to terabits per second), increased data transfer privacy, and increased data transfer security relative to conventional device-to-device data communication protocols, such as Wi-Fi, Near-Field Communications, or Bluetooth.

As noted above, a directional free-space optical communication system, such as described herein, includes at least a source device and at least one endpoint device. The source device includes at least one focused light source or laser light source and the endpoint device includes at least one photosensitive element. When light emitted from the laser light source of the source device is collimated (e.g., emitted with minimal or negligible beam divergence or convergence) and the photosensitive element of the endpoint device is positioned to accept the collimated light (e.g., the source device and the endpoint device are precisely aligned) a signal applied to modulate the laser light source can be received at the photosensitive element without substantial losses. In other words, the signal received by the photosensitive element can be characterized by a high signal-to-noise ratio that can facilitate a high data transfer rate from the source device to the endpoint device. In this configuration and alignment, the source device and the endpoint device can be described as "optically coupled." It may be appreciated that, in many embodiments, optically coupled devices can each include one or more light sources and one or more photosensitive elements to enable multi-channel and/or two-way communication and/or multi-device communication (e.g., three or more devices optically coupled). However, for simplicity of description, the embodiments that follow reference a directional free-space optical communication system configured for one-way, single-channel, data transfer from a source device to an endpoint device.

In this example, the light source of the source device can be any suitable electrical or electronic light source or combination of light sources, including both multipart and solid-state light sources. In many embodiments, a light source of a source device is a semiconductor light source such as, but not limited to: a vertical-cavity surface-emitting laser (a "VCSEL"); a vertical external-cavity surface-emitting laser; a light-emitting diode; an organic light-emitting diode; a resonant-cavity light-emitting diode; a micro-scale light-emitting diode; a superluminescent light-emitting diode; a broad-area laser diode; a diode-pumped laser; a mode-locked diode laser; an infrared band laser; an ultraviolet band laser; and so on.

In some embodiments, the light source of a source device can be optically coupled to one or more passive or active optical structures that direct, collimate, and/or focus light emitted from the light source in a particular direction or manner. Example optical structures can include, but may not be limited to: optical adapters; waveguides; optical fibers; reflectors; lenses; microlenses; beamforming and/or beam-directing lenses or lens structures; beam splitters; beam collimators; polarizers; movable lenses; color filters; cut filters; beam expanders; beam divergers; planar light wave circuits; and so on.

The photosensitive element of an endpoint device, such as described herein, can be any suitable photosensitive element or combination of elements, including both multipart and solid-state photosensitive elements operated in either photovoltaic mode (e.g., not reverse biased) or photoconductive mode (e.g., reverse biased). Example photosensitive elements include, but are not limited to: semiconductor photodiodes; semiconductor photodetectors; avalanche diodes; charge-coupled devices; and so on. Further, it may be appreciated that the size and shape of a photosensitive element can vary from embodiment to embodiment. In some cases, a "photosensitive area" of a photosensitive element can take a circular shape, whereas in other cases, the photosensitive area can take another shape (e.g., square, rectangular, octagonal, irregular, polygonal, and so on). Further, some embodiments can include more than one photosensitive area. For example, a first photosensitive area can be inset within a second photosensitive area of the same photosensitive element. In these examples, different photosensitive areas may be formed from different materials, or material combinations, and/or may have different photosensitivity or electrical characteristics (e.g., responsivity, rise time, fall time, reverse bias, dark current, and so on). In further examples, a photosensitive element can be constructed such that its photosensitive area exhibits particular electrical properties, at least in part, as a result of the materials, geometry, or dimensions of the photosensitive area. For example, it may be appreciated that different semiconductor materials (e.g., silicon, germanium, indium-gallium arsenide, gallium phosphide, and so on) may exhibit different electrical properties (e.g., responsivity, rise time, fall time, dark current, and so on) in response to stimulation by different spectral ranges and/or amplitudes of light. Similarly, different photosensitive area geometries and/or dimensions may result in different electrical properties. For example, smaller photosensitive areas may be associated with faster rise times and faster fall times.

As with the light source of the source device, in some embodiments, the photosensitive element of an endpoint device can be optically coupled to one or more passive or active optical structures that redirect and/or focus light onto the photosensitive area of the photosensitive element. Example optical structures can include, but may not be limited to: optical adapters; optical fibers; reflectors; lenses; microlenses; beamforming and/or beam-directing lenses or lens structures; beam collimators; polarizers; movable lenses; color filters; cut filters; beam concentrators; planar light wave circuits; and so on.

For simplicity of description, the embodiments that follow reference a source device including at least one VCSEL light source (hereinafter, a "laser" or "laser diode") that emits light in a spectral range including a traditionally non-visible frequency band (e.g., infrared light). Further, although not required for all embodiments, the example VCSEL light source described in reference to many embodiments that follow is presumed to be a Class 1 laser as defined by the American National Standards Association.

Similarly, for simplicity of description, the embodiments that follow reference an endpoint device including at least one semiconductor photodiode (hereinafter, a "photodiode"). The photodiode has a generally small, circular photosensitive area (e.g., having a diameter of less than 100 µm, such as 20-50 µm) and is operated in a photoconductive mode. The photosensitive area of this example photodiode is responsive to light in the spectral range emitted by the laser diode of the source device.

As noted above, a directional free-space optical communication system, such as described herein, preferably operates when the source device and the endpoint device are precisely aligned such that a considerable quantity (which may vary from embodiment to embodiment) of laser light emitted from the laser diode of the source device illuminates the photodiode of the endpoint device. Conversely, if the source device and the endpoint device are not precisely aligned, partial or total signal loss can occur because the laser diode may not effectively illuminate the photodiode.

To account for positional and/or angular offset(s) between the source device and the endpoint device—or, more generally, between the laser diode and the photodiode—many embodiments described herein reference optical structures for either or both the source device and the endpoint device that increase positional and/or angular offset tolerance.

For example, in one embodiment, an endpoint device of a directional free-space optical communication system can include an adjustable optics subsystem. In one example, the adjustable optics subsystem includes a movable lens positioned over the photodiode of the endpoint device. In other embodiments, the adjustable optics subsystem includes a movable reflective surface (e.g., mirror) positioned adjacent to the photodiode of the endpoint device. The movable reflective surface may be a flat surface or, in other embodiments, it may be curved (e.g., concave or convex, or any other suitable curvature). For simplicity of description, the embodiments that follow generally reference an adjustable optics subsystem including a single movable lens, but it may be appreciated that this is merely one example; other embodiments can include more than one movable lens, a movable reflective surface, multiple movable reflective surfaces, and/or a combination of movable lenses and reflective surfaces.

Continuing the example introduced above, an adjustable optics subsystem, such as described herein, can adjust a position of a movable lens in order to direct and/or otherwise focus laser light emitted from a laser diode of a source device onto a photosensitive area of a photodiode in the endpoint device. In this manner, positional and angular offset tolerance of the directional free-space optical communication system is increased.

In some embodiments, an adjustable optics subsystem in an endpoint device can adjust the position of a movable lens based on an output of a photodiode in the endpoint device. For example, if power output from the photodiode is less than a threshold value, the adjustable optics subsystem can cause the movable lens to shift in a selected direction. If power output from the photodiode either decreases or does not change in response to the movement, the adjustable optics subsystem may move the movable lens in another, different, direction until an increase in output power (optionally beyond a threshold, which may be different than the first threshold) is achieved.

In some cases, the adjustable optics subsystem can iterate through a number of predetermined and/or predefined positions in order to find an optimal position for the movable lens at which power output from the photodiode is a maximum. In other embodiments, the adjustable optics subsystem can cause the movable lens to follow a predetermined path relative to the photosensitive area of the photodiode (e.g., serpentine path, spiral path, and so on) in order to find an optimal position or set of positions for the movable lens at which power output from the photodiode is a maximum. In other cases, other characteristics of output from the photodiode can be used such as, but not limited to: frequency content; absolute value; voltage; current; and so on.

In these and similar examples, the movable lens can be moved to one or more predefined positions. For each predefined position of the movable lens, one or more output characteristics from the photodiode can be obtained. Thereafter, a spatial and/or angular profile or map—corresponding to, in one example, intensity of light received by the photodiode at different positions of the movable lens—can be extrapolated and/or otherwise formed from the one or more output characteristics associated with the one or more predefined positions of the movable lens. Thereafter, the movable lens can be moved to a predefined position or another position based on the spatial and/or angular profile or map.

In other cases, the adjustable optics subsystem can adjust the position of the movable lens based on output from one or more sensors within (or in communication with) the endpoint device. For example, in some cases, an endpoint device can include an accelerometer, a gyroscope, magnetoresistance sensor, a magnetometer, or any other suitable sensor. In this example, the adjustable optics subsystem can adjust the position of the movable lens (or a position of more than one movable lens or, in some embodiments, an angle of a reflective surface adjacent to the photodiode) based on output from one or more of the accelerometer, gyroscope, magnetoresistance sensor, or magnetometer.

In still further examples, the adjustable optics subsystem can adjust the position of the movable lens based on user input. For example, a user of an endpoint device may provide input corresponding to a direction of a source device. In response to receiving user input, the adjustable optics subsystem can adjust the position of the movable lens in the direction (or in the opposite direction) indicated by the user. For example, in some cases, an endpoint device may be configured to optically couple to more than one source device. In these cases, user input may be provided so that the adjustable optics subsystem moves the movable lens in order to optically couple the endpoint device to a specific or user-selected source device.

In still further examples, the adjustable optics subsystem can adjust the position of the movable lens based on, without limitation: an output from one or more optimization algorithms; feedback from another element, system or subsystem of the endpoint device; and so on. It may be appreciated that an adjustable optics subsystem such as described herein can utilize any suitable or appropriate technique, or combination of techniques, to adjust and/or set the position of a movable lens or a movable reflective surface.

In some embodiments, a source device can also include an adjustable optics subsystem. For example, the adjustable optics subsystem in a source device can include a movable lens (and/or movable reflective surface) positioned over the laser diode. In this embodiment, the adjustable optics subsystem can adjust a position of the movable lens, biasing the movable lens in one or more directions, in order to direct and/or otherwise focus laser light emitted from the laser diode toward an endpoint device. The adjustable optics subsystem of a source device can be configured in the same manner as described above in reference to the example endpoint device.

In certain further embodiments, a source device can include a first adjustable optics subsystem and an endpoint device can include a second adjustable optics subsystem. In this example, the first adjustable optics subsystem can be used to direct laser light emitted from the laser diode in the source device toward the endpoint device. Similarly, the second adjustable optics subsystem can be used to focus laser light received from the source device onto the photosensitive area of the photodiode of the endpoint device. In this manner, the first adjustable optics subsystem and the second adjustable optics subsystem can cooperate to direct laser light emitted from the laser diode onto the photosensitive area of the photodiode of the endpoint device. In further embodiments, the first adjustable optics subsystem and the second adjustable optics subsystem can communicate with one another in order to more quickly and/or more accurately focus laser light emitted from the laser diode onto the photosensitive area of the photodiode. For example, the source device can encode information regarding the position of the movable lens of the first adjustable optics subsystem into the laser light emitted by the laser diode. In this example, the endpoint device can use the information regarding the position of the movable lens of the first adjustable optics subsystem to adjust the position of the movable lens of the second adjustable optics subsystem. In other cases, a position of the movable lens of the first adjustable optics subsystem can be communicated to the second adjustable optics subsystem via an auxiliary or secondary communication channel or protocol, such as via Wi-Fi, Bluetooth, Near-Field Communications, Infrared, or Ethernet protocols. One may appreciate that these are merely examples; in other embodiments, a position of the movable lens of the first adjustable optics subsystem can be communicated to the second adjustable optics subsystem using any other suitable technique. In some further embodiments, relative positions of the movable lenses of the first and second adjustable optics subsystems can be used to determine an angle and/or positional offset between a source device and an endpoint device.

These foregoing and other embodiments are discussed below with reference to FIGS. 1A-9. However, those skilled in the art will readily appreciate that the detailed description given herein with respect to these figures is for explanatory purposes only and should not be construed as limiting.

FIG. 1A depicts a directional free-space optical communication system 100 communicably and optically coupling two electronic devices, identified as the source device 102 and the endpoint device 104. In the illustrated example, the source device 102 and the endpoint device 104 are separated by an air gap 106 (e.g., free space). In typical examples, the source device 102 and the endpoint device 104 are battery-operated portable electronic devices, but this may not be required; in some embodiments, one or both of the source device 102 and the endpoint device 104 are substantially stationary.

As noted above, the source device 102 and the endpoint device 104 can be any suitable electronic devices; example electronic devices are non-exhaustively listed above. The source device 102 includes a housing 108 enclosing, at least in part, an optical communication module 110 that includes a laser diode. Similarly, the endpoint device 104 includes a housing 112 enclosing, at least in part, an optical communication module 114 that includes a photodiode. In some cases, such as illustrated, the optical communication module 110 can extend at least partially through the housing 108, although this is not required. In some cases, a protective cover (e.g., lens window) can be provided in the housing 108. In these embodiments, the optical communication module 110 is positioned behind the protective cover. The optical communication module 114 can be similarly configured in the housing 112.

As noted with respect to other embodiments described herein, the source device 102 and the endpoint device 104 can be configured for multi-channel and/or two-way communication. In these examples, the optical communication module 110 of the source device 102 includes at least one photodiode and the optical communication module 114 of the endpoint device 104 includes at least one laser diode. For simplicity of description, one-way, single-channel communication from the source device 102 to the endpoint device 104 is described below.

The laser diode of the optical communication module 110 of the source device 102 emits a beam of light $u_1$ across the air gap 106 toward the photodiode of the optical communication module 114 of the endpoint device 104. As noted above, by modulating one or more characteristics of the beam of light $u_1$, the source device 102 can communicate digital and/or analog information to the endpoint device 104 (hereinafter referred to as, simply, "data" communicated from a source device to an endpoint device). Example beam characteristics that can be modulated by the source device 102 to communicate data to the endpoint device 104 are non-exhaustively listed above.

In some examples, data communicated by the source device 102 to the endpoint device 104 can be encoded according to a particular schema (e.g., code division; time division; quadrature modulation; phase shift keying; frequency-shift keying; amplitude-shift keying; pulse code modulation; and so on) and/or may be encrypted. In other examples, the data communicated by the source device 102 to the endpoint device 104 can conform to a particular data transfer protocol—whether proprietary or standardized—such as, but not limited to: universal serial bus (typically referred to as "USB"); peripheral component interconnect express standard (typically referred to as "PCIe"); controller area network (typically referred to as "CAN"); on-board diagnostics (typically referred to as "ODB" or "ODB-II"); serial peripheral interface bus (typically referred to as "SPI Bus"); high-definition multimedia interface (typically referred to as "HDMI"); Ethernet; integrated drive electronics (typically referred to as "IDE"); serial or parallel advanced technology attachment (typically referred to as "SATA" or "PATA"); inter-integrated circuit bus (typically referred to as "I2C"); and so on. In other cases, more than one protocol, encoding, and/or encryption technique or technology can be used in parallel.

The data communicated by the source device 102 to the endpoint device 104 can be any suitable data or data type including but not limited to: real-time data; data streams; data files; configuration files; encryption keys; messages; media files or streams; local or remote network resources or addresses; synchronization data; firmware; software; networking data; human interface device and/or sensor data streams or configurations; and so on. In other cases, data communicated by the source device 102 to the endpoint device 104 can be associated with a secure shell or other remote login session. In other cases, data communicated by the source device 102 to the endpoint device 104 can be associated with a serial data link or serial connection between the source device 102 and the endpoint device 104. In still further examples, other data or data types—or combinations of data or data types—can be communicated from the source device 102 to the endpoint device 104.

Figure 1B:
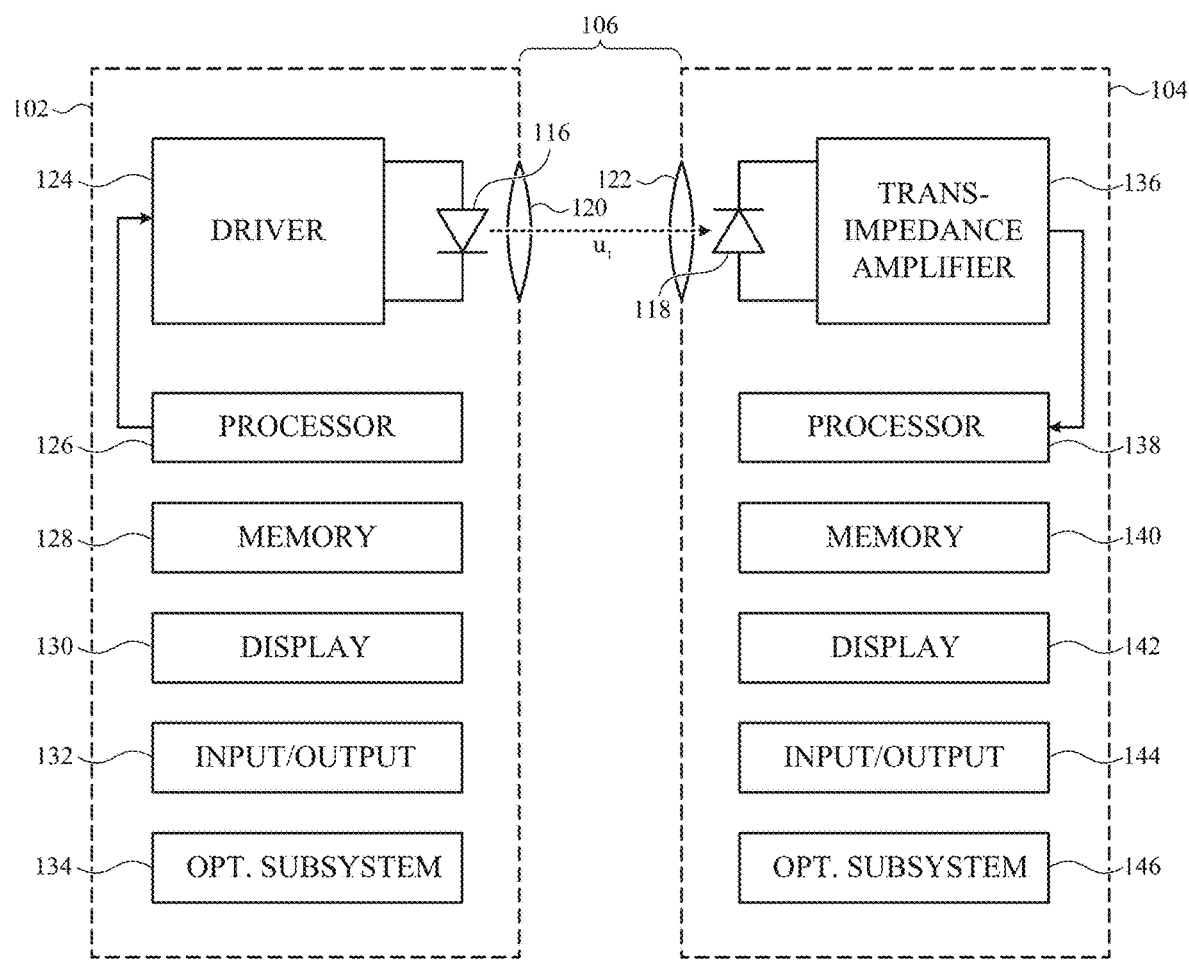
FIG. 1B is a simplified system diagram of the directional free-space optical communication system of FIG. 1A.
Figure 2A:
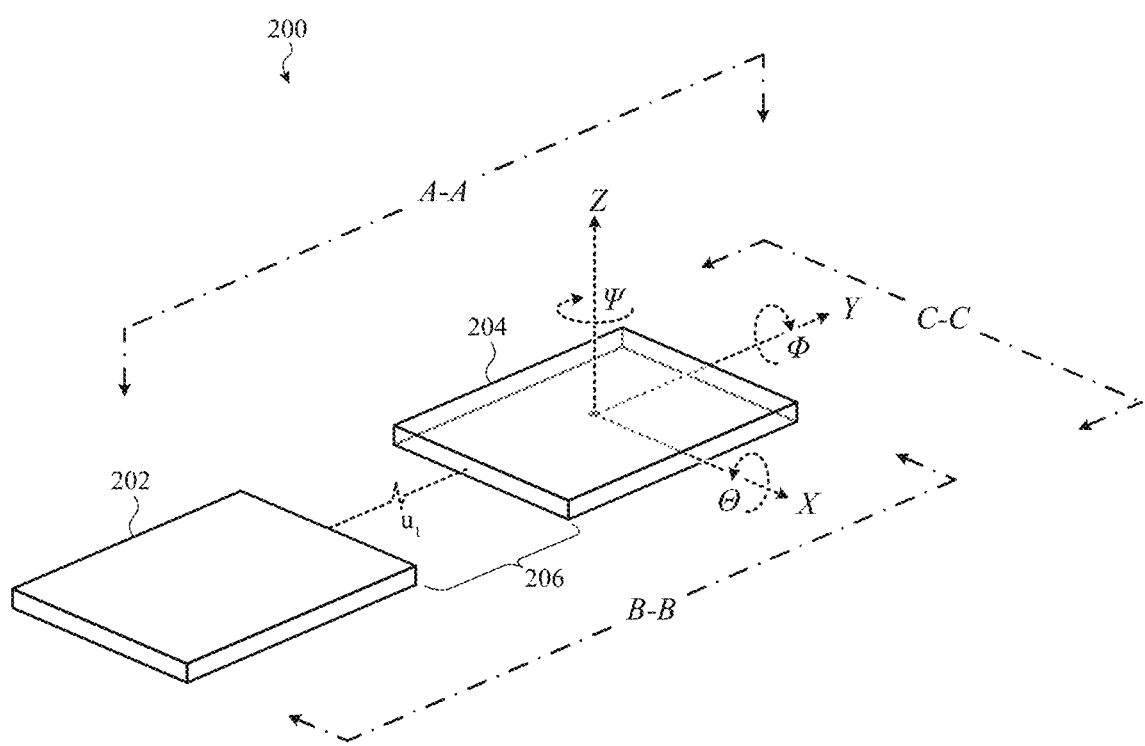
FIG. 2A depicts a simplified representation of a source device and an endpoint device, collimated relative to one another.
Figure 2B:
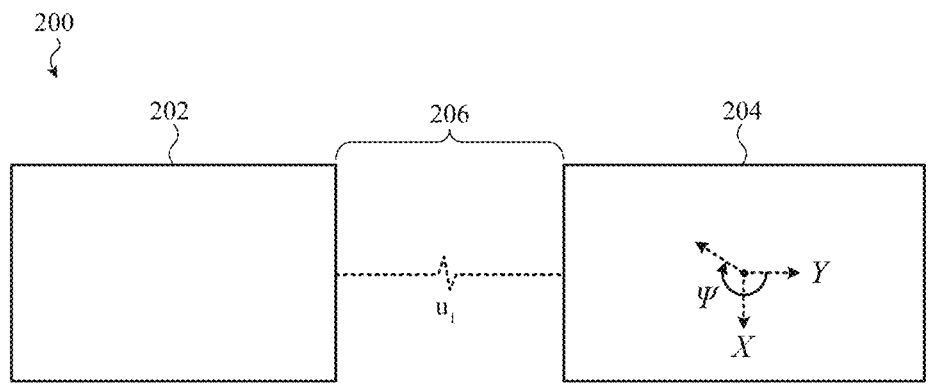
FIG. 2B depicts the simplified representation of the collimated devices of FIG. 2A, viewed along line A-A.
Figure 2C:
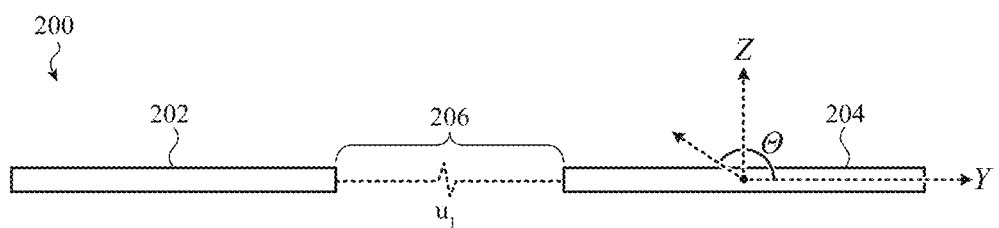
FIG. 2C depicts the simplified representation of the collimated devices of FIG. 2A, viewed along line B-B.
Figure 2D:
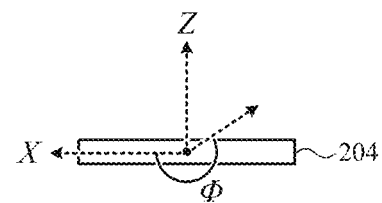
FIG. 2D depicts the simplified representation of the collimated devices of FIG. 2A, viewed along line C-C.

It may be appreciated that the foregoing description of FIG. 1A, and the various alternatives thereof and variations thereto are presented, generally, for purposes of explanation, and to facilitate a thorough understanding of various possible configurations of a directional free-space optical communication system, such as described herein. However, it will be apparent to one skilled in the art that some of the specific details presented herein may not be required in order to practice a particular described embodiment, or an equivalent thereof. For simplicity of description and illustration, FIG. 1B is provided. This figure depicts a simplified block diagram of the source device 102 and the endpoint device 104 of FIG. 1A, showing various operational and/or structural components that can be included in certain embodiments.

FIG. 1B depicts a simplified system diagram of the directional free-space optical communication system 100 of FIG. 1A. As shown in the figure, the source device 102 includes a laser diode 116 that emits the beam of light $u_1$ toward the endpoint device 104 in order to illuminate a photodiode 118 to communicate data to the endpoint device 104.

The source device 102 can (optionally) include an optical structure 120 to adjust one or more characteristics of the beam of light $u_1$ as it exits the source device 102. As noted above, the optical structure 120 can be configured to move a movable lens to direct the beam of light $u_1$ toward the endpoint device 104 in order to accommodate a greater range of positional and/or angular offset(s) of the endpoint device 104 (see, e.g., FIGS. 2A-3).

Similarly, the endpoint device 104 can (optionally) include an optical structure 122 to adjust one or more characteristics—such as a direction—of the beam of light $u_1$ before the beam of light $u_1$ illuminates the photodiode 118. Example characteristics of a beam of light that can be modified by an optical structure, such as described herein, are non-exhaustively provided above. Non-exhaustive example optical structures that can be included in a source device are described below in reference to FIG. 3. Non-exhaustive example optical structures that can be included in an endpoint device are described below in reference to FIGS. 3-5B.

The laser diode 116 of the source device 102 is coupled to a drive circuit, identified as the drive circuit 124. The drive circuit 124 can be any suitable analog or digital circuit or purpose-configured processor, or combination thereof configured to generate direct current and/or alternating current signals suitable to drive the laser diode 116 to emit laser light. The drive circuit 124 is typically configured to control a level of current circulated through the laser diode 116, although this may not be required; other embodiments may control a voltage applied across the laser diode 116. The drive circuit 124 can apply any suitable current or voltage waveform to cause the laser diode 116 to emit laser light in any suitable manner (e.g., pulse width, duty cycle, color, frequency, amplitude, and so on). The laser light may be monochromatic or polychromatic. The laser diode 116 may be a single mode or a multi-mode laser. As may be appreciated, the waveform applied to the laser diode 116 corresponds to the data to be communicated from the source device 102 to the endpoint device 104 and will accordingly vary from embodiment to embodiment and will be based on the content of the data to be communicated.

The source device 102 can also include other components, including a processor 126, a memory 128, a display 130, an input/output system 132, an adjustable optics subsystem 134, and so on.

In many configurations, the processor 126 of the source device 102 can be configured to access and execute instructions stored in the memory 128 in order to instantiate any number of suitable classes, objects, virtual machines, threads, pipelines, and/or routines to perform, monitor, and/or coordinate one or more operations of the source device 102. Further, the processor 126 can be communicably coupled—either directly (e.g., via general-purpose input/output pins) or indirectly (e.g., via an intermediary circuit or integrated circuit)—to each of the hardware components of the source device 102, including the display 130, the input/output system 132, the adjustable optics subsystem 134, and the drive circuit 124. In this manner, the processor 126 can coordinate the operation of the various hardware components of the source device 102.

As one example, the processor 126 can cause the display 130 to render a user interface while monitoring a user input sensor (e.g., capacitive touch sensor, capacitive force sensor, and so on) of the input/output system 132 to detect one or more characteristics of a user's physical interaction with the display 130. As a result of this construction, a user of the source device 102 is encouraged to interact with content shown on the display 130.

The adjustable optics subsystem 134 of the source device 102 can be configured in a number of ways. In typical implementations, the adjustable optics subsystem 134 includes at least one processor, generally referred to as a controller. The controller of the adjustable optics subsystem 134 is communicably coupled to an actuation mechanism (not shown) configured to move a movable lens of the optical structure 120.

In these embodiments, the controller of the adjustable optics subsystem 134 causes the actuation mechanism to move the movable lens in any suitable direction by any suitable amount. As noted with respect to other embodiments described herein, the controller may be configured to cause the actuation mechanism to move the moveable lens in order to direct laser light emitted from the laser diode 116 in a particular direction, such as toward the endpoint device 104.

In some embodiments, the actuation mechanism of the adjustable optics subsystem 134 is configured to move and/or shift the movable lens of the optical structure 120 in a single, linear direction (e.g., a single degree of freedom). In other cases, the actuation mechanism is configured to move the movable lens in more than one linear direction (e.g., multiple degrees of freedom). In still further embodiments, the actuation mechanism of the adjustable optics subsystem 134 is configured to move and/or shift the movable lens in a vertical direction, relative to the laser diode 116. In still further embodiments, the actuation mechanism of the adjustable optics subsystem 134 is configured to tilt the movable lens to an angle relative to an exterior surface of the laser diode 116. In some embodiments, the actuation mechanism can be configured to tilt, move, and/or shift the movable lens.

It may be appreciated that the actuation mechanism of the adjustable optics subsystem 134 can vary from embodiment to embodiment. In one example, the actuation mechanism is magnetically controlled. More specifically, the actuation mechanism includes an electromagnet positioned along an axis of the movable lens of the optical structure 120. The actuation mechanism also includes a permanent magnet (or second electromagnet) coupled to the movable lens and aligned with the electromagnet. The actuation mechanism also includes a centering element formed from an elastic material or structure, such as a spring or an elastomer. The centering element supports the movable lens and exerts a restoring force to re-center the movable lens over the laser diode 116 when the actuation mechanism is not activated.

As a result of this construction, the controller of the adjustable optics subsystem 134 can apply a current to the electromagnet in order to attract or repel the permanent magnet (and thus the movable lens) by a certain amount proportional and/or related to both the magnitude of current applied and the restoring force applied by the centering element. As such, by varying the amount of current applied to the electromagnet, the controller of the adjustable optics subsystem 134 can precisely control the position of the movable lens along the axis of the movable lens with which the electromagnet is aligned.

In a further implementation of this example, the adjustable optics subsystem 134 can include two or more electromagnets, each associated with, and aligned with, a respective permanent magnet (or secondary electromagnets) coupled to the movable lens of the optical structure 120. In this embodiment, the controller of the adjustable optics subsystem 134 can precisely control the position of the movable lens along multiple axes. In one embodiment, the adjustable optics subsystem 134 includes two magnetically controlled actuation mechanisms that are positioned ninety degrees offset from one another. In this configuration, one of the two actuation mechanisms can control movement of the movable lens in an "X" direction, whereas the other actuation mechanism can control movement of the movable lens in a "Y" direction.

In other embodiments, the actuation mechanism may be implemented differently. Suitable actuation mechanisms include, but are not limited to: piezoelectric actuation mechanisms; magnetostrictive mechanisms; mechanisms implemented with electroactive polymers; mechanisms implemented with shape-memory wire; and so on. For simplicity of description, the embodiments that follow generally reference an adjustable optics subsystem that includes a magnetically controlled actuation mechanism, but it is appreciated that this is merely one example.

Returning to the endpoint device 104 depicted in FIG. 1B, the photodiode 118 is coupled to amplifier 136. In many embodiments, the amplifier 136 is a transimpedance amplifier, but this may not be required of all embodiments. As with the drive circuit 124 of the source device 102, the amplifier 136 can be any suitable analog or digital circuit or purpose-configured processor, or combination thereof. The amplifier 136 is typically configured to convert a level of current circulated through the photodiode 118 to a corresponding level of voltage, although this may not be required.

In some examples, the amplifier 136 is coupled to a multi-bit analog-to-digital converter (not shown) to quantize the level of voltage output from the amplifier 136 into a series of digitally represented values.

In other cases, the amplifier 136 can be coupled to a single-bit analog-to-digital converter or a limiting amplifier configured to generate a sequence of voltages that correspond to digital data (e.g., ones and zeros). In other words, an output of the amplifier 136 can be coupled to an input (e.g., a gate) of a high-speed switching element (e.g., diode, transistor, and so) in order to quantize the voltage output from the amplifier 136 as either a binary one or a binary zero.

In still other examples, the amplifier 136 can be coupled to a buffer and/or shift register configured to convert serial information received from the source device into a parallel data.

In still further examples, the output from amplifier 136 can be provided directly (with or without a resistor or other elements in series, such as a high-pass filter) to an input of a digital circuit for further processing. As may be appreciated, the waveform output from the photodiode 118 corresponds to the data to be communicated from the source device 102 to the endpoint device 104 and will accordingly vary from embodiment to embodiment and will be based on the content of the data communicated to the endpoint device 104.

Similar to the source device 102 described above, the endpoint device 104 can also include other components, including a processor 138, a memory 140, a display 142, an input/output system 144, an adjustable optics subsystem 146, and so on.

Similar to the processor 126 of the source device 102 described above, in many configurations, the processor 138 of the endpoint device 104 can be configured to access and execute instructions stored in the memory 140 in order to instantiate any number of suitable classes, objects, virtual machines, threads, pipelines, and/or routines to perform, monitor, and/or coordinate one or more operations of the endpoint device 104. Further, the processor 138 can be communicably coupled—either directly (e.g., via general-purpose input/output pins) or indirectly (e.g., via an intermediary circuit or integrated circuit)—to each of the hardware components of the endpoint device 104, including the display 142, the input/output system 144, the adjustable optics subsystem 146, and the amplifier 136. In this manner, the processor 138 can coordinate the operation of the various hardware components of the endpoint device 104 in a manner similar to that described above in reference to the processor 126 of the source device 102.

Similarly, it may be appreciated that the adjustable optics subsystem 146 can be appropriately configured in the same manner as the adjustable optics subsystem 134 described above. Namely, it is understood that the adjustable optics subsystem 146 can include a controller and an actuation mechanism configured to cooperate to move a movable lens associated with the optical structure 122.

Accordingly, generally and broadly in view of FIGS. 1A-1B, it is understood that a directional free-space optical communication system can be configured in a number of ways. For example, as noted above, certain electronic devices can operate as both a source device and an endpoint device. In this manner, two-way optical communication can be achieved. Further, in certain embodiments, a source device can include more than one laser diode and an endpoint device can include more than one photodiode. In this manner, multi-channel optical communication can be achieved.

Further, although the illustrations of FIG. 1A-1B depict optical communication modules as purpose-configured components, this may not be required. For example, in some embodiments, a display or other light source of a source device can be used to transmit data using the techniques and methods described herein. Similarly, a camera or a proximity sensor of an endpoint device can be used to receive data using the techniques and methods described herein.

Further, it is appreciated that the specific configuration(s) shown in FIGS. 1A-1B are not required. In other cases, a laser diode of a source device and/or a photodiode of an endpoint device can be disposed in portions of an electronic device housing different from the positions shown.

Additionally, it may be appreciated that other components and/or systems may be included in particular embodiments. For example, as noted above, in some examples, light emitted from a laser diode of a source device can be configured to conform to a standardized data transfer protocol, such as PCIe. In these embodiments, the endpoint device may include one or more circuits, processors, or components configured to route the information received from the source device directly to a component or subsystem of the endpoint device that responds to the standardized protocol. In this manner, a processor in the source device can directly access and/or control a resource of the endpoint device via the directional free-space optical communication system.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, in many embodiments, alignment between a source device and an endpoint device in the collimated regime may not be guaranteed. FIGS. 2A-2D depict a simplified representation of a directional free-space optical communication system 200 in which a source device 202 and an endpoint device 204 are movable and separated by an air gap 206. As with other embodiments described herein, a beam of light $u_1$ emitted from a laser diode in the source device 202 propagates through the air gap 206 along a line-of-sight path toward the endpoint device 204 to illuminate a photodiode in the endpoint device 204.

In many cases, the endpoint device 204 may be movable relative to the source device 202. In the illustrated embodiment, six axes of potential movement are shown including three translational axes and three rotational axes. More specifically, the endpoint device 204 can move—relative to the source device 202—in three-dimensional space in an X-direction (e.g., to the left or to the right of the source device 202; see, e.g., FIG. 2B), in a Y-direction (e.g., toward or away from the source device 202; see, e.g., FIG. 2C), and/or in a Z-direction (e.g., above or below the source device 202; see, e.g., FIG. 2D). Similarly, the endpoint device 204 can rotate about the Y-direction axis to an angle $\Phi$ (e.g., roll; see, e.g., FIG. 2D), about the X-direction axis to an angle $\Theta$ (e.g., pitch; see, e.g., FIG. 2C), and/or about the Z-direction axis to an angle $\Psi$ (e.g., yaw; see, e.g., FIG. 2B).

To account for variations in alignment between a source device and an endpoint device of a directional free-space optical communication system, many embodiments optically couple one or more passive or active optical structures or elements—such as reflectors, lenses, waveguides, adjustable optics subsystems, and so on—to either or both the laser diode in a source device or the photodiode in an endpoint device.

Figure 3:
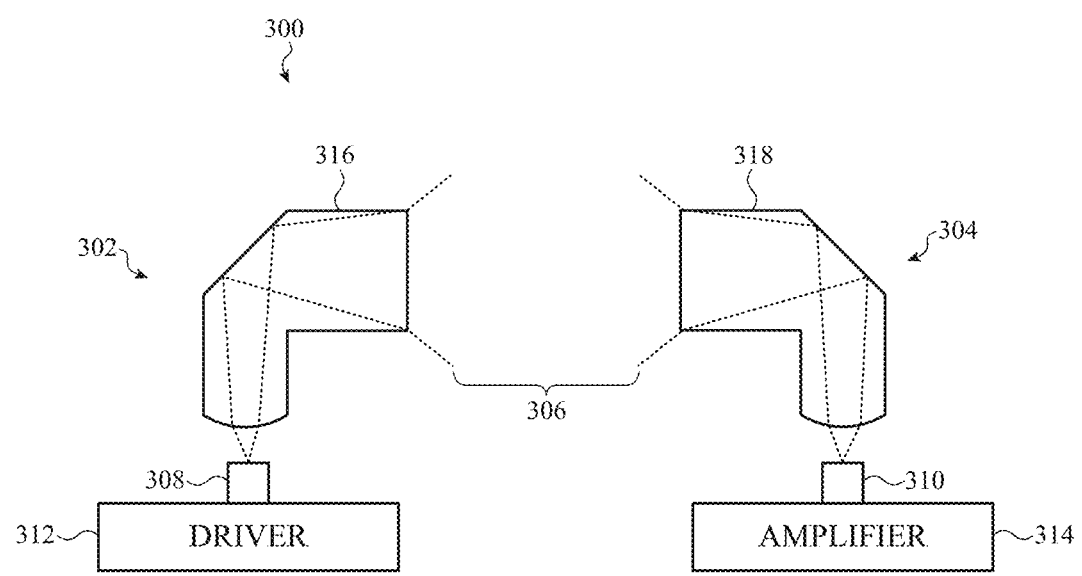
FIG. 3 depicts a system diagram of a directional free-space optical communication system, such as described herein.

FIG. 3 depicts a system diagram of a directional free-space optical communication system 300. As with other embodiments described herein, the system includes a source device 302 and an endpoint device 304 that are separated by an air gap 306. The source device 302 includes a laser diode 308 and the endpoint device 304 includes a photodiode 310. The laser light output from the laser diode 308 is modulated and/or otherwise controlled according to a selected data signal or waveform by a drive circuit 312. In the endpoint device 304, the photodiode 310 is electrically coupled to an amplifier 314 that may be a transimpedance amplifier configured to convert current output from the photodiode 310 into a variable voltage. In some embodiments, the amplifier 314 also provides a reverse bias to the photodiode 310 so that the photodiode 310 operates in a photoconductive mode and not a photovoltaic mode.

In many embodiments, the drive circuit 312 of the source device 302 is formed onto a semiconductor substrate that provides both mechanical support and electrical connection to the laser diode 308. The drive circuit 312 of the source device 302 can be implemented and/or fabricated in a number of suitable ways. In some examples, the drive circuit 312 and the laser diode 308 are fabricated in the same process or operation, but this may not be required. In some embodiments, the drive circuit 312 may be positioned off-board from a rigid substrate or flexible circuit board to which the laser diode 308 is coupled. It may be appreciated that the simplified layout shown in FIG. 3 is merely one example and that many other implementations and circuit topologies may be possible.

Similarly, the amplifier 314 of the endpoint device 304 can be formed onto a semiconductor substrate that provides both mechanical support and electrical connection to the photodiode 310. As with the drive circuit 312 of the source device 302, the amplifier 314 of the endpoint device 304 can be implemented and/or fabricated in a number of suitable ways. In some examples, the amplifier 314 and the photodiode 310 are fabricated in the same process or operation, but this may not be required. In some embodiments, the amplifier 314 may be positioned off-board from a rigid substrate or flexible circuit board to which the photodiode 310 is coupled. As noted above, it may be appreciated that the simplified layout shown in FIG. 3 is merely one example and that many other implementations and circuit topologies may be possible.

The source device 302 also includes an optical adapter 316 configured to reflect and/or diverge a laser light beam emitted from the laser diode 308, thereby increasing the beam width, divergence angle, and/or beam cross-section by a certain designed amount. In other cases, other beam parameters can be adjusted by the optical adapter 316. In the illustrated embodiment, the optical adapter 316 also redirects the laser light beam emitted from the laser diode 308 ninety degrees, although this may not be required and/or may vary from embodiment to embodiment.

It may be appreciated, however, that diverging and/or redirecting the beam output from the laser diode 308 beyond a threshold amount may be undesirable and may contribute to losses. Accordingly, for embodiments described herein, the optical adapter 316 of the source device 302 is typically configured to modify one or more characteristics of the beam output from the laser diode 308 in order to increase positional and angular offset tolerance of the optical communication system without increasing losses beyond a certain selected threshold amount, which may vary from embodiment to embodiment.

In some embodiments, the optical adapter 316 can be associated with an adjustable optics subsystem of the source device 302. In particular, in some embodiments, the optical adapter 316 can be coupled to an actuation mechanism (not shown) configured to shift and/or tilt the optical adapter 316 to change and/or tune a direction to which light emitted by the laser diode 308 propagates. For example, the actuation mechanism of the adjustable optics subsystem can move the optical adapter 316 in any suitable direction relative to the laser diode 308. In other embodiments, the optical adapter 316 can be tilted relative to the laser diode 308.

In the illustrated embodiment, the endpoint device 304 can also include an optical adapter 318 configured to reflect and/or concentrate the laser light beam emitted from the laser diode 308 onto the photodiode 310, thereby increasing the quantity of light (e.g., quantity of photons) received by the photodiode 310. In the illustrated embodiment, similar to the optical adapter 316 described above, the optical adapter 318 also redirects the laser light beam emitted from the laser diode 308 ninety degrees, although—as noted above—this may not be required and/or may vary from embodiment to embodiment. It may be appreciated that, by concentrating the laser light beam in this manner, the optical adapter 318 of the endpoint device 304 also servers to increase positional and angular offset tolerance of the optical communication system. In other words, in some embodiments, as a result of the wider area across which light is collected by the endpoint device 304, the photodiode 310 of the endpoint device 304 can remain illuminated by the laser light beam emitted from the laser diode 308 even if the endpoint device 304 is offset from the source device 302 by a small amount.

Similar to the optical adapter 316, the optical adapter 318 can be associated with an adjustable optics subsystem of the endpoint device 304. The optical adapter 318 can be configured in the same manner described above with respect to the optical adapter 316.

In many embodiments, the optical adapter 316 and the optical adapter 318 are made from the same material, but this may not be required. Example materials for the optical adapter 316 and the optical adapter 318 can include, but may not be limited to flexible or rigid: optically clear polymers; glass; optically-clear ceramics; plastics; and so on. In some cases, the optical adapter 316 and/or the optical adapter 318 can be treated with an optically reflective outer coating, such as a mirrored or metallic coating. In other cases, other appropriate surface finishes and/or external layers can be added.

Furthermore, although the optical adapter 316 and the optical adapter 318 are illustrated as above, and separated from the laser diode 308 and the photodiode 310, respectively, it may be appreciated that this configuration may not be required of all embodiments. For example, in one embodiment, the optical adapter 316 may be optically coupled to an outer surface of the laser diode 308 via an optically clear adhesive, which may be flexible. More particularly, in some embodiments, the optically clear adhesive optically coupling the optical adapters 316, 318 to the laser diode 308 and the photodiode 310, respectively, may also serve as a centering element, at least partially providing a restoring force to the optical adapters 316, 318 in embodiments incorporating adjustable optics subsystems in either or both the endpoint device 304 or the source device 302.

In this case, the optically clear adhesive may be selected to provide a smooth refractive index transition from the laser diode 308 to the optical adapter 316; the optically clear adhesive may be selected to have a refractive index between that of the optical adapter 316 and the laser diode 308. It may be appreciated that the photodiode 310 and the optical adapter 318 may be similarly configured.

In other embodiments, additional adapters, lenses, and/or reflectors can be included. For example, in some embodiments, the optical adapter 316 can be optically coupled to the laser diode 308 via a second adapter (e.g., a fiber optic cable). In other cases, one or more lenses (e.g., concave, convex, Fresnel, and so on) can interpose the laser diode 308 and the optical adapter 316. It may be appreciated that the photodiode 310 and the optical adapter 318 may be similarly configured.

As noted above, in some embodiments, the source device and the endpoint device can each include additional and/or alternative optical structures—such as optical stabilization subsystems—to increase the quantity of light received by the photodiode of an endpoint device. Generally and broadly, FIGS. 4A-5B each depict various implementations of an optical stabilization subsystem that can be bodily incorporated into either or both source devices and endpoint devices, such as described herein. For simplicity of description, the embodiments that follow are described in reference to an example optical stabilization subsystem incorporated into an endpoint device, but it may be appreciated that the systems described below can also be incorporated into a source device such as described herein.

Figure 4A:
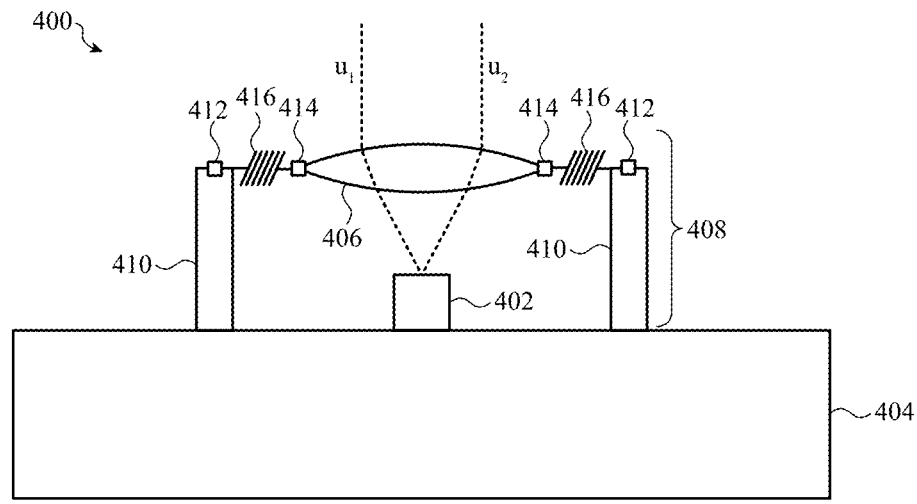
FIG. 4A depicts an endpoint device of a directional free-space optical communication system, such as described herein, including a laterally movable lens.

FIG. 4A depicts an endpoint device 400 of a directional free-space optical communication system. As with other endpoint devices described herein, the endpoint device 400 includes a photodiode 402 that is disposed onto and/or coupled (e.g., electrically, mechanically, and so on) to a substrate 404 that can include an amplifier, such as a transimpedance amplifier. The substrate 404 may be flexible or rigid and can be made from any suitable material or combination or layering of materials. In some embodiments, the substrate 404 is formed, at least in part, from a semiconductor material.

As noted with respect to other embodiments described herein, the endpoint device 400 of FIG. 4A includes an optical stabilization subsystem in order to increase angular and/or positional offset tolerance between the endpoint device 400 and a source device (not shown).

More specifically, the photodiode 402 is positioned below a movable lens 406 that is configured to shift in at least one lateral direction. As the movable lens 406 changes position, light entering the lens can be repositioned over a photosensitive area of the photodiode 402. In a more specific example, if laser light enters the movable lens 406 from a direction normal to an outer surface of the photodiode 402, such as shown by the laser light beams $u_1$ and $u_2$ of FIG. 4A, repositioning of the movable lens 406 may not be required. In other words, light beams incident ninety degrees from a face of the photodiode 402 may be focused onto the photosensitive area of the photodiode 402 without any movement or shifting of the movable lens 406.

Figure 4B:
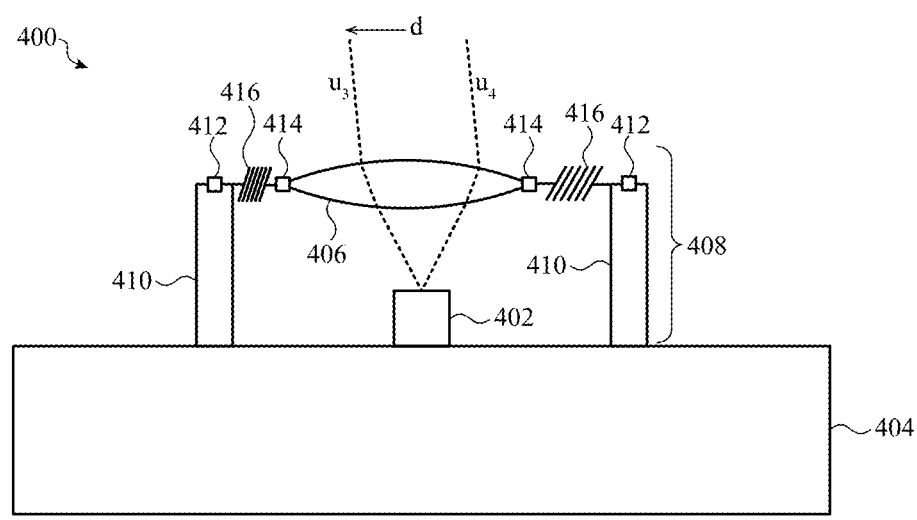
FIG. 4B depicts the movable lens of FIG. 4A, shifted in a direction.

On the contrary, if laser light enters the movable lens 406 from a direction offset from normal to an outer surface of the photodiode 402, such as shown by the laser light beams $u_3$ and $u_4$ of FIG. 4B, repositioning of the movable lens 406 may be preferred. In other words, light beams not incident ninety degrees from a face of the photodiode 402 may be repositioned and/or refocused onto the photosensitive area of the photodiode 402 by moving, translating, and/or otherwise shifting a position of the movable lens 406.

To facilitate the movement described above, the movable lens 406 is supported, at least in part, by an actuation mechanism 408. The actuation mechanism 408 includes at least two supports, identified as the supports 410, that elevate the movable lens 406 an appropriate distance above the photodiode 402. The distance by which the supports 410 elevate the movable lens 406 may vary from embodiment to embodiment, but it is appreciated that changing the distance between the movable lens 406 and the photodiode 402 may change the extent to which light entering the movable lens 406 is focused onto the photosensitive area of the photodiode 402. In other words, it may be appreciated that the distance separating the photodiode 402 and the movable lens 406 may vary from embodiment to embodiment and/or based on one or more characteristics of the movable lens 406 (e.g., radius of curvature, focal length, shape, and so on) or one or more characteristics of the photodiode 402 (e.g., size and/or area of the photosensitive area, height of the photodiode 402, and so on). In some embodiments, the distance between the movable lens 406 and the photodiode 402 is fixed, although this may not be required; in other embodiments, the distance between the photodiode 402 and the movable lens 406 can be dynamically adjusted.

The actuation mechanism 408 also includes one or more electromagnets, identified as the electromagnets 412, that can be selectively actuated to attract and/or repel the movable lens 406 (see, e.g., FIG. 4B). More specifically, the electromagnets 412 are positioned so as to attract or repel permanent magnets (or, in alternative embodiments, additional or auxiliary electromagnets) disposed and coupled to a periphery of the movable lens 406. Two example permanent magnets are identified in FIGS. 4A-4B as the permanent magnets 414.

In typical examples, the optical stabilization subsystem also includes a controller that, in some cases, can be formed into and/or otherwise coupled to the substrate 404. The controller, as noted above, is configured to apply one or more electrical signals to the actuation mechanism 408—or, more specifically, to the electromagnets 412 of the actuation mechanism 408—in order to control movement of the movable lens 406 in particular directions and by particular amounts.

More specifically, in the illustrated example, the controller of the optical stabilization subsystem can be configured to control electrical current applied to the electromagnets 412, thereby causing the electromagnets 412 to each generate a corresponding magnetic field having a specific magnitude and polarity. By controlling the polarity and amplitude of current applied to each of the electromagnets 412, the controller can effectively control the magnetic fields generated by the electromagnets 412 and, in turn, control the amount or extent to which the magnetic fields generated by the electromagnets 412 attract or repel the permanent magnets 414. In some examples, the controller can apply current to only one electromagnet at a time, whereas in other examples the controller applies current to multiple electromagnets at the same time.

The controller can be a processor, digital circuit, analog circuit, or any combination thereof. In many examples, the controller can be communicably coupled to one or more sensors of the optical stabilization subsystem, the endpoint device 400, or a sensor in communication with the endpoint device 400. In these examples, the controller can be configured to move the movable lens 406 in response to receiving input from a sensor (or more than one sensor).

For example, in one embodiment, the endpoint device 400 includes an inertial sensor, such as a gyroscopic sensor (also referred to as an angular rate or angular velocity sensor). The inertial sensor can be configured to monitor for, and report, movement of the endpoint device 400. In response to a movement of the endpoint device 400 reported by the inertial sensor, the controller of the optical stabilization subsystem can be configured to adjust the position of the movable lens 406 to counteract the movement of the endpoint device 400 in substantially real time. For example, if the inertial sensor reports that endpoint device 400 has shifted to the right of the page as shown in FIGS. 4A-4B, the controller of the optical stabilization subsystem can cause the actuation mechanism 408 to move the movable lens 406 to the left of the page as shown in FIG. 4B, thereby counteracting the reported movement of the endpoint device 400.

In many examples, the actuation mechanism 408 also includes a centering element 416. As noted with respect to other embodiments described herein, the centering element 416 can serve to provide a restoring force that resists changes in position of the movable lens 406 caused by the actuation mechanism 408. In the illustrated embodiment, the centering element 416 is a mechanical spring; although this is merely one example. In other embodiments, the centering element 416 may be implemented in another manner. Example centering elements include, but are not limited to: elastomers; leaf springs; spiral springs; flexion rods; and so on.

The foregoing embodiment depicted in FIGS. 4A-4B is merely one example construction of an optical stabilization subsystem such as described herein. As such, it may be appreciated that an optical stabilization subsystem can be configured in a manner different than shown. Regardless the particular construction selected for a particular implementation, it may be appreciated that incorporating an optical stabilization subsystem into either or both a source device or an endpoint device of a directional free-space optical communication system, such as described herein, can increase angular and positional offset tolerance between the source device and the endpoint device, thereby improving the range, reliability, and speed of communication between the two devices.

Furthermore, it is appreciated that the single degree of freedom construction, as depicted in FIGS. 4A-4B, is merely one example. In other embodiments, an actuation mechanism of an optical stabilization subsystem can be configured to shift a movable lens (and/or movable reflector) in any suitable direction. For example, in some embodiments, an actuation mechanism can include four electromagnets disposed at ninety-degree intervals around a perimeter or periphery of a movable lens. Each of the four electromagnets can be positioned relative to a permanent magnet coupled to the movable lens. In this example, a controller of the optical stabilization subsystem can be configured to apply current to one or more of the four electromagnets in order to move the movable lens in two dimensions. In other cases, an actuation mechanism can include a different number of electromagnet/permanent magnet pairs.

In still further examples, an actuation mechanism, such as described herein, may be configured to operate without generating magnetic fields. Non-magnetic actuation mechanisms that may be appropriately incorporated into an optical stabilization subsystem, such as described herein include, but are not limited to: electrostatic attraction mechanisms; piezoelectric mechanisms; pressure bladder mechanisms; microscopic electromechanical actuators; electroactive polymer mechanisms; shape-memory alloy mechanism; and so on. In some cases, a centering element can also serve to move the movable lens. For example, the centering element may be a spring formed from a shape memory alloy; when supplied with current, the centering element changes shape, changing the position of the movable lens in one or more directions. When the supply of current is terminated, the movable lens can return to a central position.

In still further embodiments, an actuation mechanism may be configured to tilt a movable lens (and/or a photodiode or laser diode below the lens) in addition to—or as an alternative to—laterally shifting the movable lens, such as described above in reference to FIGS. 4A-4B.

Figure 5A:
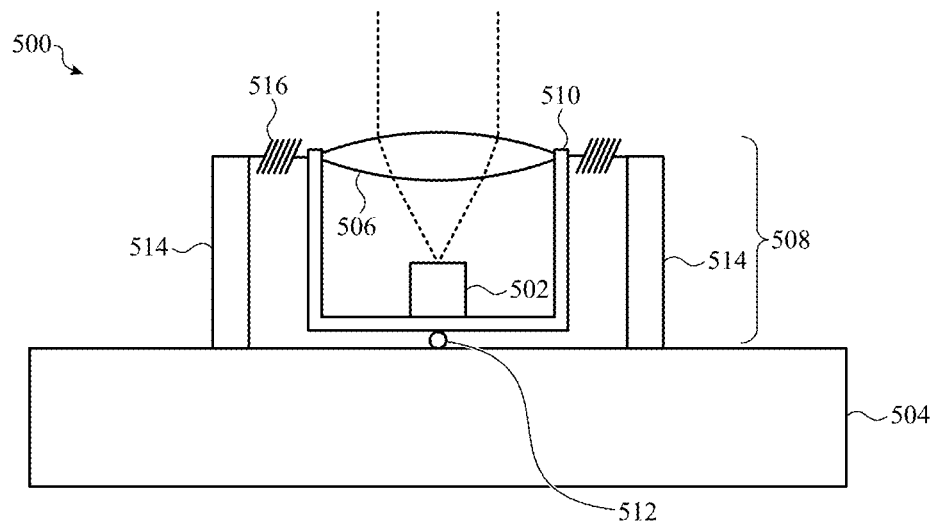
FIG. 5A depicts an endpoint device of a directional free-space optical communication system, such as described herein, including an angularly movable optical subassembly.
Figure 5B:
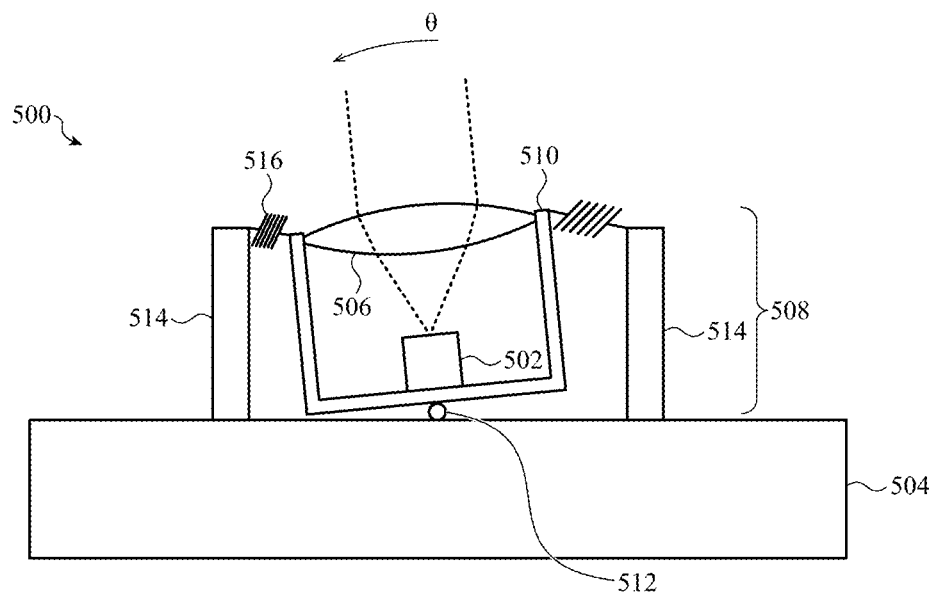
FIG. 5B depicts the movable lens of FIG. 5A, tilted in a direction.

FIG. 5A depicts an endpoint device 500 of a directional free-space optical communication system including an optical stabilization subsystem. The endpoint device 500 includes a photodiode 502 and a substrate 504. The photodiode 502 (and, additionally, an amplifier such as described in reference to other embodiments describe herein) is positioned below, and aligned with, a lens 506. The lens 506 and the photodiode 502 are supported by an actuation mechanism 508 that includes a pivoting frame 510. The pivoting frame 510 pivots over a fulcrum point 512 toward or away from a support 514. A centering element 516 is disposed between the pivoting frame 510 and the support 514 to provide a restoring force that resists changes in position (e.g., angle) of the pivoting frame 510 (see, e.g., FIG. 5B). In this embodiment, a controller of the optical stabilization subsystem can be configured to provide a signal to the actuation mechanism 508 to cause the actuation mechanism 508 to tilt the pivoting frame 510 in a particular direction. In one example, the actuation mechanism can include electromagnets and permanent magnets such as described above in reference to FIGS. 4A-4B.

It may be appreciated that the foregoing description of FIGS. 4A-5B, and the various alternatives thereof and variations thereto are presented, generally, for purposes of explanation, and to facilitate a thorough understanding of various possible configurations of an adjustable optics subsystem in an endpoint device or source device of a directional free-space optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 6A:
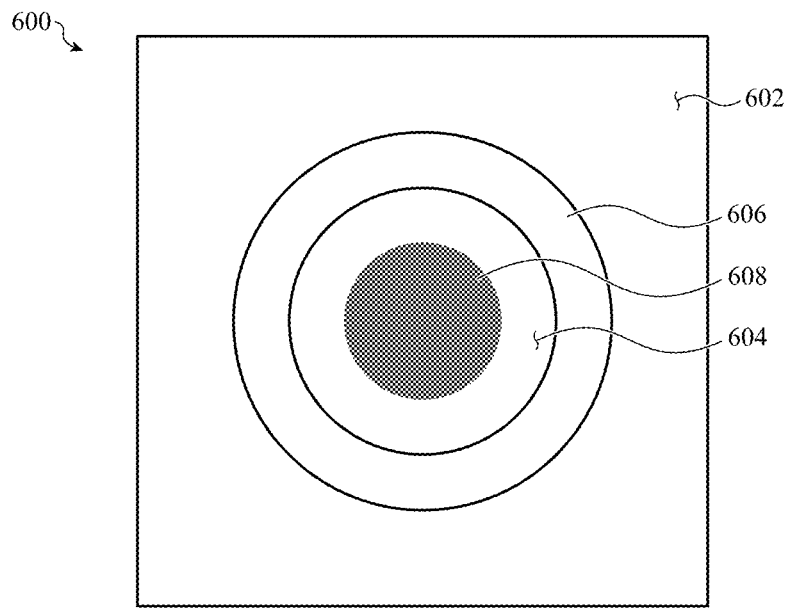
FIG. 6A depicts a top view of a photodiode of an endpoint device of a directional free-space optical communication system, such as described herein, depicting a beam spot illuminating a central region of a photosensitive area of the photodiode.
Figure 6B:
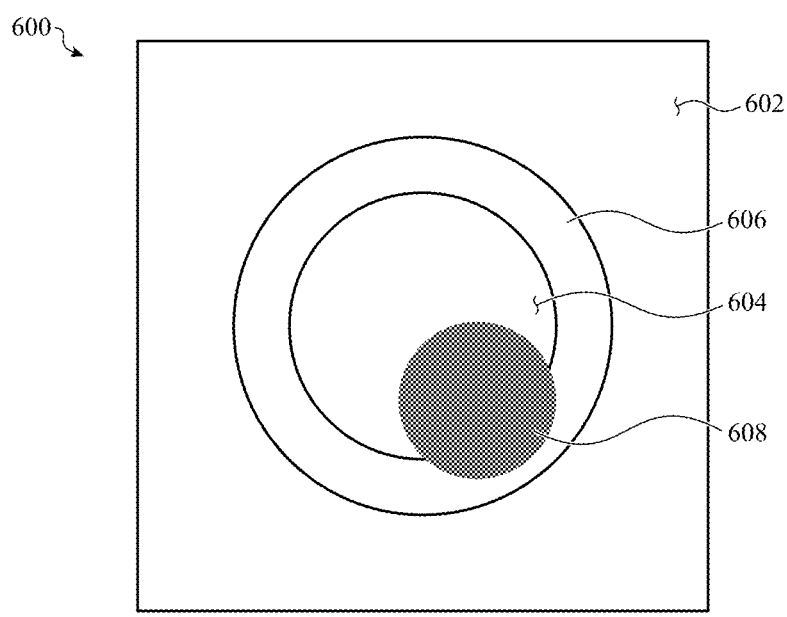
FIG. 6B depicts the photodiode of FIG. 6A, depicting the beam spot shifted in a direction relative to the central region of the photosensitive area.

For example, a controller of an adjustable optics subsystem can be configured to move and/or tilt a movable lens in response to any appropriate stimulation. For example, a controller of an adjustable optics subsystem in an endpoint device of a directional free-space optical communication system can be configured to monitor power output from the photodiode of the endpoint device to determine whether light received on the photosensitive area of the photodiode is appropriately positioned on the photosensitive area. For example, FIG. 6A depicts a top view of a photodiode 600 of an endpoint device of a directional free-space optical communication system. The photodiode 600 is disposed in a component enclosure that defines an exterior surface 602 that defines a photosensitive area illustrated as the central portion 604 of the exterior surface. The central portion 604 is defined in the geometric center of the exterior surface 602, surrounded by a partition 606 (acting as an aperture) formed from metal. The partition 606 separates the central portion 604 from the remaining portion of the photosensitive area such that the remaining portion of the photosensitive area surrounds the central portion 604, separated by the partition 606. In some cases, the photodiode 600 can include a partition formed from another material such as plastic, ink, glass, and so on; metal may not be required for all embodiments and the partition 606 is merely one example.

As a result of this construction, a focused beam 608 that is not properly positioned/aligned in the central portion 604 (see, e.g., FIG. 6B) of the photosensitive area can at least partially illuminate the partition 606, causing power output from the central portion 604 to fall. Once the controller of the adjustable optics subsystem recognizes that power output from the central portion 604 of the photodiode 600 has dropped beyond a threshold value, it can instruct an actuation mechanism to move the movable lens in order to re-center the focused beam 608 relative to the central portion 604 (see, e.g., FIG. 6A).

As noted with respect to other embodiments described herein, the controller of the adjustable optics subsystem can move the movable lens in any suitable manner, following any suitable technique. In one example, once a drop in power is detected, the controller of the adjustable optics subsystem can instruct the movable lens to move in a pre-defined pattern, such as a cross pattern. As the movable lens is moved, the controller can monitor power output from the photodiode to determine a location of the movable lens that corresponds to the highest power output. In the case that more than one location of the movable lens corresponds to high power output, an average location (e.g., geometric center of mass of the multiple high-power locations) may be used if the output at that location is above a threshold value. In still other embodiments, the controller of the adjustable optics subsystem can implement a maximization algorithm to determine the coordinate location of the movable lens corresponding to maximum power output from the photodiode. Suitable algorithms can include: watershed algorithms; gradient ascent/descent algorithms; segmentation algorithms; and so on. It may be appreciated that any technique and/or combination of techniques can be used by the controller to determine a position for a movable lens.

In some examples, the controller of the adjustable optics subsystem can continually operate in a feedback loop in order to continually adjust the position of the movable lens. Feedback can be received by the controller from any suitable feedback source including, without limitation: inertial sensors; positional sensors; data or information from a source device or endpoint device; output from an optimization algorithm; output power from the central region of the photodiode and/or outer region of the photodiode; and so on.

In other cases, the controller of the adjustable optics subsystem can be configured to adjust the position of the movable lens at a particular time (e.g., interval, scheduled time or date, and so on) or in response to a particular trigger. For example, the controller of the adjustable optics subsystem can be configured, in one embodiment, to adjust the position of the movable lens only in response to a request to send or receive data using the directional free-space optical communication system. In other cases, other triggers can be received by the controller including, but not limited to: user input; data or information received from a communication channel different from the directional free-space optical communication system (e.g., Wi-Fi, Bluetooth, Near-Field communication, Ethernet, and so on); data or information received via the directional free-space optical communication system; and so on.

In some cases, an adjustable optics subsystem in a source device of a directional free-space optical communication system can cooperate with an adjustable optics subsystem in an endpoint device of the same system. For example, both devices can be placed in a pairing or linking mode. When in the pairing or linking mode, the adjustable optics subsystem in the source device can cause the movable lens to scan in a particular direction or according to a particular scanning pattern and/or predefined pattern (e.g., line-scan vertically and/or horizontally). In some embodiments, when in the pairing or linking mode, the movable lens in the source device is moved at a first, high speed.

While the adjustable optics subsystem in the source device is scanning, the adjustable optics subsystem in the endpoint device may be static or may scan at a lower rate than the adjustable optics subsystem in the source device, monitoring power output from the photodiode for an increase in power. Once an increase in power is detected, the endpoint device can signal the source device using an appropriate communication protocol or technique to stop scanning. In some cases, a timestamp can be sent to the source device, but this may not be required.

In other cases, the signal from the endpoint device may cause the source device to scan at a second, lower rate or speed within a particular angular range based on, in some examples, the time at which the source device received the signal to stop scanning from the endpoint device. Thereafter, once the adjustable optics subsystem in the source device has determined a position for the movable lens, the adjustable optics subsystem in the endpoint device can begin moving the movable lens in accordance with one or more techniques described herein. In this manner, the adjustable optics subsystem in the source device and the adjustable optics subsystem in the endpoint device cooperate to increase angular and/or positional offset tolerance between the two devices.

Figure 6C:
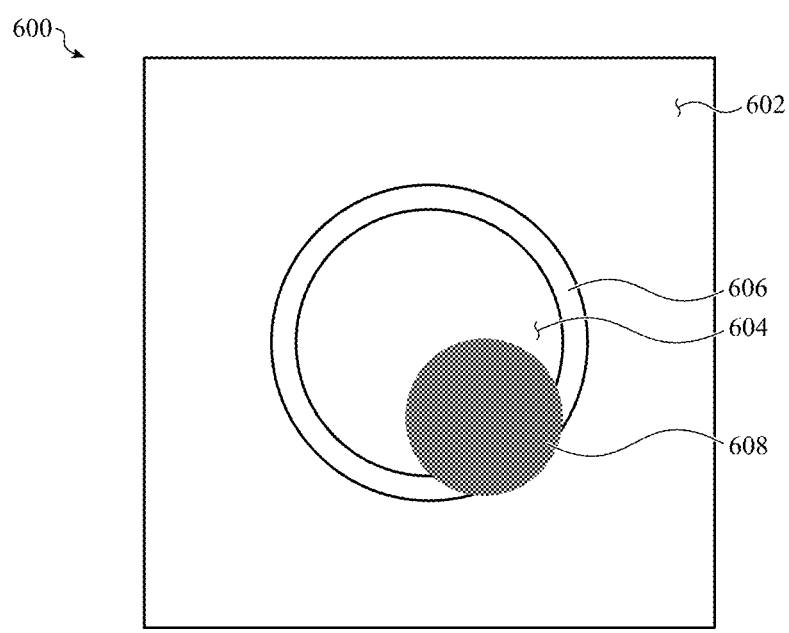
FIG. 6C depicts a top view of another photodiode of an endpoint device of a directional free-space optical communication system, such as described herein, depicting a beam spot illuminating more than one photosensitive area of the photodiode.

Still further embodiments can be configured in a different manner. For example, as shown in FIG. 6C, in some examples, the partition 606 can be thin, relative to the expected cross-sectional area of the focused beam 608.

As a result of this construction, a focused beam 608 that is not properly positioned/aligned in the central portion 604 of the photosensitive area can at least partially illuminate the remaining portion of the photosensitive area of the photodiode 600, causing power output from the central portion 604 to fall and causing power output from the remaining portion to increase. Once the controller of the adjustable optics subsystem recognizes that power output from the central portion 604 of the photodiode 600 has dropped beyond a threshold value and/or that power output from the remaining portion has increased, it can instruct an actuation mechanism to move the movable lens in order to re-center the focused beam 608 relative to the central portion 604 (see, e.g., FIG. 6A).

Figure 7:
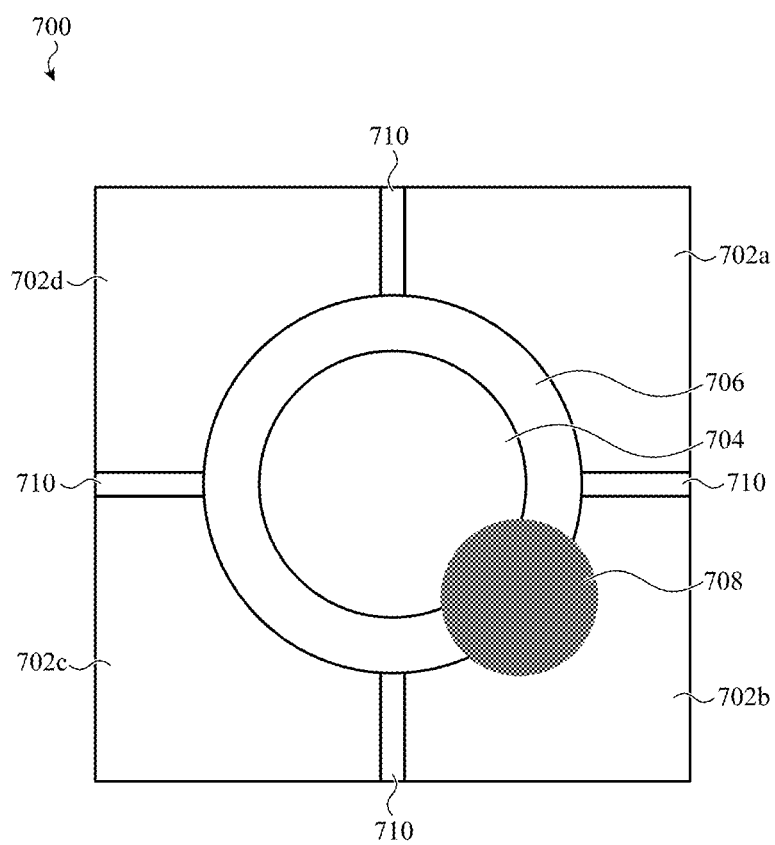
FIG. 7 depicts a top view of another photodiode of an endpoint device of a directional free-space optical communication system, such as described herein, including a segmented photosensitive area and depicting a beam spot illuminating more than one photosensitive area of the photodiode.

In still further examples, the remaining portion of the photosensitive area can be segmented. For example, FIG. 7 depicts a photodiode 700 that, like the embodiments depicted in FIGS. 6A-6C, includes an exterior surface 702 that defines a photosensitive area. A central portion 704 of the photosensitive area is defined in the geometric center of the exterior surface 702, surrounded by a partition 706 formed from a material such as metal. The partition 706 separates the central portion 704 from the remaining portion of the photosensitive area. In this embodiment, the remaining portion of the photosensitive area is partitioned, segmented, and/or otherwise separated into four discrete regions evenly distributed around the periphery/perimeter of the partition 706, labeled as the segments 702a-702d of the remaining portion of the photosensitive area. In particular, the remaining portion of the photosensitive area is partitioned by a metal mask 710.

As a result of this construction, a focused beam 708 that is not properly positioned/aligned in the central portion 704 of the photosensitive area can at least partially illuminate at least one segment 702a-702d of the remaining portion of the photosensitive area of the photodiode 700, causing power output from the central portion 704 to fall and causing power output from the illuminated segment(s) to increase. Once the controller of the adjustable optics subsystem recognizes that power output from the central portion 704 of the photodiode 700 has dropped beyond a threshold value and/or that power output from the remaining portion has increased, it can instruct an actuation mechanism to move the movable lens in order to re-center the focused beam 708 relative to the central portion 704 (see, e.g., FIG. 6A). In this example, re-centering movement of the movable lens may be performed proportionality based on which of the segment(s) 702a-702d are illuminated. For example, if the segment 702b is illuminated, but none of the other segments are illuminated, the controller of the adjustable optics subsystem can cause the movable lens to change position such that the focused beam 708 moves diagonally toward the segment 702d. Similarly, if the segment 702b is illuminated along with the segment 702a, but neither of the other two segments is illuminated, the controller of the adjustable optics subsystem can cause the movable lens to change position such that the focused beam 708 moves horizontally toward the left of the figure.

It may be appreciated that four segments, such as shown, is merely one example. Other embodiments can include a greater or less number of segments, segment patterns or distributions, and so on. Further, in other embodiments, the distribution of segments may not be uniform; in some cases, segments along horizontal regions of a photodiode may have a smaller area than segments along vertical regions of the photodiode.

It may be appreciated that the foregoing description of FIGS. 6A-7, and the various alternatives thereof and variations thereto are presented, generally, for purposes of explanation, and to facilitate a thorough understanding of various possible configurations of an adjustable optics subsystem in an endpoint device or source device of a directional free-space optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 8:
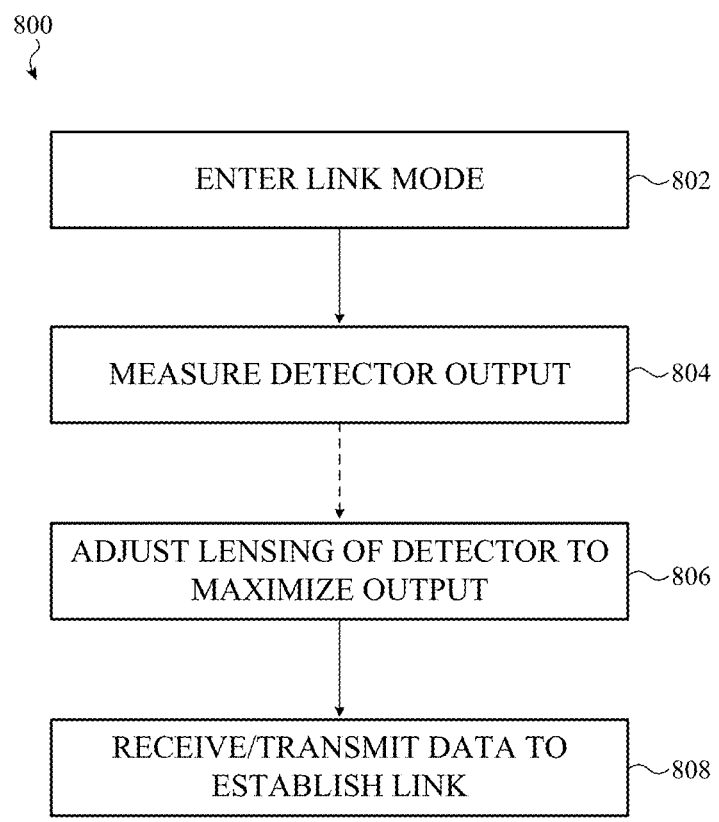
FIG. 8 is a simplified flow chart showing example operations of a method of positioning a movable lens in a directional free-space optical communication system, such as described herein.
Figure 9:
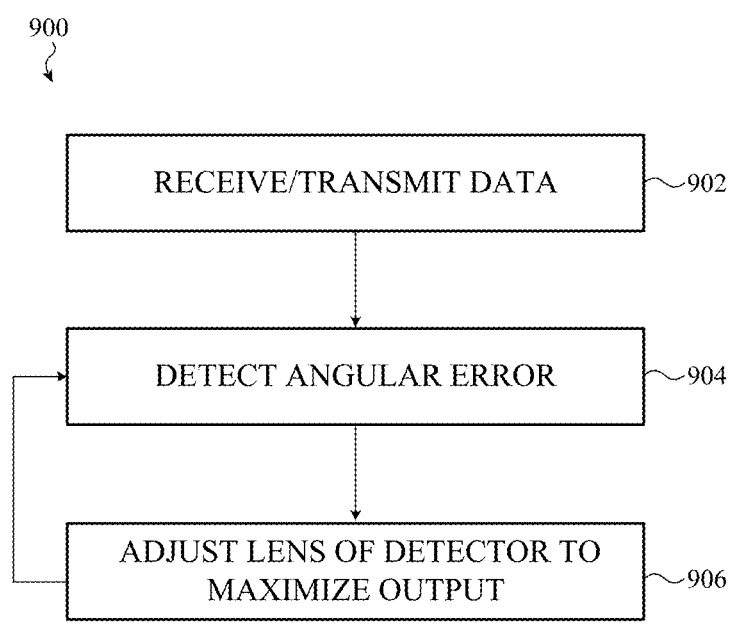
FIG. 9 is a simplified flow chart showing example operations of another method of positioning a movable lens in a directional free-space optical communication system, such as described herein.

Generally and broadly, FIGS. 8-9 depict simplified flow charts corresponding to various ordered and/or unordered operations of methods that may be used to manufacture one or more components such as described herein. It may be appreciated that these simplified examples may be modified in a variety of ways. In some examples, additional, alternative, or fewer operations than those depicted and described may be possible.

FIG. 8 is a simplified flow chart showing example operations of a method of positioning a movable lens in a directional free-space optical communication system, such as described herein.

The method 800—which can be performed by one or more controllers of an adjustable optics subsystem, such as described herein—includes operation 802 in which at least one of a source device or an endpoint device of a directional free-space optical communication system, such as described herein, enters a link mode. At operation 804, a power output (or other suitable output or characteristic, such as voltage, current, or resistance) of a photosensitive element or photodetector is measured. As noted with respect to embodiments described herein, the photosensitive element is typically disposed within an endpoint device. Next, at operation 806, a lens positioned above the photodetector is adjusted, if necessary. Finally, at operation 808, a communication link between the endpoint device and the source device can be established via appropriate handshake and/or negotiation. In other words, the device(s) may exit the link mode and may proceed to exchange data or information via the directional free-space optical communication system by entering a communication mode or a data transfer mode.

In many cases, a directional free-space optical communication system includes two devices that each can function as a source device and an endpoint device. In these examples, the method 800 can be performed by both communicated devices, either simultaneously or otherwise, in order to ensure that the photodiode of one device is appropriately aligned with the laser diode of the other device and vice versa.

FIG. 9 is a simplified flow chart showing example operations of another method of positioning a movable lens in a directional free-space optical communication system, such as described herein. The method 900 begins at operation 902 in which data is received at an endpoint device from a source device of an optical communication system. Next, at operation 904, an error can be detected that corresponds to an angular offset between the source device and the endpoint device. As described above, the error can be detected based on a received power drop detected in the endpoint device. Next, at operation 906, a position of a movable lens in the endpoint device can be adjusted to maximize power output. The method then continues back to operation 904. In other embodiments, a movable lens in an endpoint device can be moved based on historical or recent position information. In some embodiments, a movable lens can be moved based on a predicted future location of a source device (e.g., a prediction based on an estimation algorithm, such as a Kalman filter).

In some cases, an angular error detected at operation 904 cannot be corrected by operation 906. In these cases, an endpoint device may generate a notification to a user and/or to the source device that the communication link between the source device and the endpoint device has been broken.

In many cases, a directional free-space optical communication system includes two devices that each can function as a source device and an endpoint device. In these examples, the method 900 can be performed by both communicated devices, either simultaneously or otherwise, in order to ensure that the photodiode of one device is appropriately aligned with the laser diode of the other device and vice versa.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. An apparatus for free-space optical communication comprising:
   a substrate;
   a photosensitive element coupled to the substrate and comprising:
      a first photosensitive area; and
      a second photosensitive area circumscribing the first photosensitive area;
   a movable lens above the photosensitive element; and a controller coupled to the movable lens and configured to adjust a position of the movable lens based on a first power output from the first photosensitive area and a second power output from the second photosensitive area.

2. The apparatus of claim 1, wherein the first photosensitive area is positioned in a geometric center of an exterior surface of the photosensitive element.

3. The apparatus of claim 1, wherein the second photosensitive area is segmented.

4. The apparatus of claim 3, wherein the second photosensitive area includes at least three segments.

5. The apparatus of claim 4, wherein:
the second power output is from a first segment of the at least three segments of the second photosensitive area; and
the controller is configured to adjust the position of the movable lens based on a third power output from a second segment of the at least three segments of the second photosensitive area.

6. The apparatus of claim 1, wherein the controller is configured to adjust the position of the movable lens in response to an increase in the second power output and a decrease in the first power output.

7. The apparatus of claim 1, wherein the first photosensitive area and the second photosensitive area are separated by a partition formed from metal.

8. A system for free-space optical communication comprising:
a first apparatus comprising:
a light source;
a first movable lens above the light source; and
a first controller configured to adjust a first position of the first movable lens in a pattern; and
a second apparatus comprising:
a photosensitive element comprising:
a first photosensitive area; and
a second photosensitive area;
a second movable lens above the photosensitive element; and
a second controller configured to adjust a second position of the second movable lens based on changes in power output from the first photosensitive area and the second photosensitive area.

9. The system of claim 8, wherein:
the light source comprises a vertical-cavity surface-emitting laser; and
the photosensitive element comprises a photodiode.

10. The system of claim 8, wherein the second controller is configured to adjust the second position of the second movable lens after the first controller stops scanning.

11. The system of claim 8, wherein the second controller is configured to tilt the second movable lens.

12. The system of claim 11, wherein the second controller is configured to tilt the photosensitive element with the second movable lens.

13. The system of claim 8, wherein the second controller is configured to shift the second movable lens laterally.

14. The system of claim 8, wherein:
the first photosensitive area is circular; and
the second photosensitive area surrounds the first photosensitive area.

15. The system of claim 14, wherein the second photosensitive area is segmented.

16. A method of operating a free-space optical communication system comprising a source device and an endpoint device, the method comprising:
changing a first position of a first movable lens according to a pattern, the first movable lens positioned over a laser diode in the source device;
monitoring a first power output from at least one photosensitive area of a photodiode in the endpoint device;
in response to the first power output crossing a first threshold, sending a signal to the source device to stop changing the first position of the first movable lens;
changing a second position of a second movable lens positioned over the photodiode;
monitoring a second power output from at least one photosensitive area of the photodiode; and
in response to the second power output crossing a second threshold, stopping movement of the second movable lens.

17. The method of claim 16, wherein the pattern is predefined.

18. The method of claim 16, wherein changing the first position of the first movable lens is performed, at least in part, by a controller of an adjustable optics subsystem in the source device.

19. The method of claim 16, further comprising entering a data transfer mode by the source device and the endpoint device after stopping movement of the second movable lens.

* * * * *